United States Patent
Probst

(10) Patent No.: US 6,571,461 B2
(45) Date of Patent: Jun. 3, 2003

(54) LINEAR GUIDE WITH AN AIR BEARING HAVING PROVISION FOR HEATING A SUPPORT ELEMENT OF THE LINEAR GUIDE TO MAINTAIN FLUID GAP

(75) Inventor: Urs Probst, Lausanne (CH)

(73) Assignee: ESEC Trading SA, Cham (CH)

( * ) Notice: Subject to any disclaimer, the term of this patent is extended or adjusted under 35 U.S.C. 154(b) by 0 days.

(21) Appl. No.: 09/825,315

(22) Filed: Apr. 3, 2001

(65) Prior Publication Data

US 2001/0025411 A1 Oct. 4, 2001

(30) Foreign Application Priority Data

Apr. 4, 2000 (CH) ............................................. 0669/00

(51) Int. Cl.$^7$ ................................................. B23F 19/10
(52) U.S. Cl. ............................... 29/740; 29/739; 29/741
(58) Field of Search ........................... 29/739, 740, 741

(56) References Cited

U.S. PATENT DOCUMENTS

| 4,697,933 | A | * | 10/1987 | Morita ........................ 384/100 |
| 5,163,222 | A | | 11/1992 | Imlia et al. |
| 6,084,998 | A | * | 7/2000 | Straayer ..................... 359/572 |
| 6,185,815 | B1 | | 2/2001 | Schindler |

FOREIGN PATENT DOCUMENTS

| DE | 0991110 A1 | * | 4/2000 |
| EP | 387 312 B1 | | 2/1995 |
| EP | 0 991 110 | | 4/2000 |
| JP | M-864V. 13/No. 385 | | 8/1989 |
| JP | M-1485V.17/No. 530 | | 9/1993 |
| JP | 08312646 A | | 11/1996 |
| JP | 01194847 | | 7/1999 |
| JP | 11190339 | | 7/1999 |
| WO | WO 93/24953 | | 12/1993 |

* cited by examiner

*Primary Examiner*—Charles G. Freay
*Assistant Examiner*—Emmanuel Sayoc
(74) *Attorney, Agent, or Firm*—McCormick, Paulding & Huber LLP

(57) ABSTRACT

A linear guide comprises a support element and a carriage sliding on the support element. The carriage has two hollow cylinders sliding on an air bearing on the support element and a body arranged between them. The support element and the two hollow cylinders of the carriage are separated by a gap to which compressed air can be applied. A linear motor formed from a u-shaped stator and an armature is foreseen as drive mechanism for the carriage. During operation, heat dissipation occurs in the armature which heats the carriage. In order to maintain changes in the thickness of the gap within predetermined limits, the support element and/or those parts of the carriage whose temperature influence the thickness of the gap are heated to a predetermined temperature.

16 Claims, 1 Drawing Sheet

Figure 1:
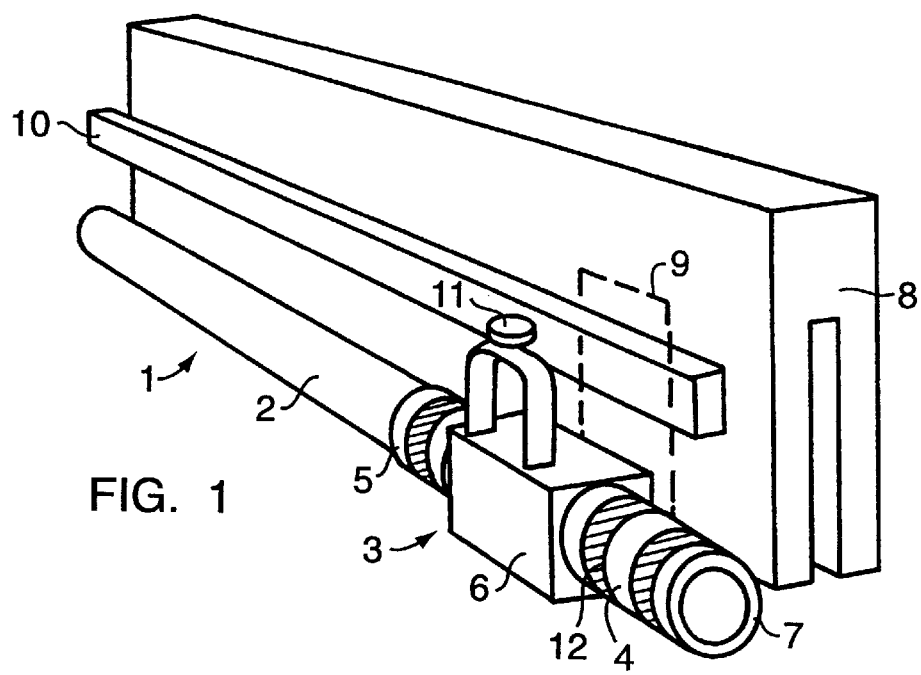

LINEAR GUIDE WITH AN AIR BEARING HAVING PROVISION FOR HEATING A SUPPORT ELEMENT OF THE LINEAR GUIDE TO MAINTAIN FLUID GAP

BACKGROUND OF THE INVENTION

The invention concerns a linear guide with an air bearing.

For the assembly of semiconductor chips automatic assembly machines known as "Die Bonders" are used which serve to mount the numerous, uniform chips of a wafer, which are located next to each other on a carrier, one after the other onto a substrate, e.g., a metallic leadframe. Coordinated with the pick-and-place movement of a chip gripper, a wafer table on which the chip carrier is located presents a next chip and the substrate is likewise shifted in order to present a new substrate position at a second location. In order to pick and subsequently place the chip, the chip gripper can be raised and lowered in a known way. U.S. Pat. No. 5,163,222 discloses a die bonder and U.S. Pat. No. 6,185,815 discloses a pick and place apparatus of the die bonder. Both patents are incorporated by reference.

Extremely high demands are set on such Die Bonders, in particular on the bearing arrangement of the moved parts. For the further processing of the mounted chips, they must be placed with positional accuracy on the substrate which requires the correspondingly accurate arrival of the chip gripper at the second location and already presupposes the accurate approach to the first location for picking the chip. On the other hand, high speeds and short cycle times are required which cause correspondingly high accelerations and forces of inertia to occur on the moved parts.

Up to now, various lever mechanisms which partially contain rocker guides have been used to produce the alternating movements of the chip gripper. Because of the considerable forces occurring on them, guides of this type are disadvantageous for a precise movement sequence and must be appropriately maintained. With another known mechanism, the chip gripper sits on the end of a lever which moves back and forth, i.e., corresponding to the slewing deflections of the lever, it experiences an arc-shaped movement which must always be stopped at the limit positions whereby a strong tendency to oscillations exists. A disadvantage of such lever-operated mechanisms lies in that they only allow transport of the chip in a fixed, predetermined path from a location A to a location B.

Driving mechanisms are also known with which the chip gripper is driven by means of a toothed belt. The disadvantage here is the large inaccuracy of placing the chip on the substrate.

From Japanese Patent application JP 01 194847 an air bearing is known with which a refrigerator is used to cool the air bearing. Such a cooling system has several drawbacks in that it makes the air bearing heavy and complicated.

The object of the invention is to develop a drive for the Pick and Place system of a Die Bonder with which the transport of a semiconductor chip allows high placement accuracy over any distances.

The named object is solved in accordance with the invention by means of a linear guide with an air bearing for the Pick and Place system of a Die Bonder.

BRIEF DESCRIPTION OF THE INVENTION

A linear guide comprises a support element and a carriage sliding on the support element. The carriage has two hollow cylinders sliding on an air bearing on the support element and a body arranged between them. The support element and the two hollow cylinders of the carriage are separated by a gap to which compressed air can be applied. A linear motor formed from a u-shaped stator and an armature is foreseen as drive mechanism for the carriage. During operation, heat dissipation occurs in the armature which heats the carriage. In order to maintain changes in the thickness of the gap within predetermined limits, the support element and/or those parts of the carriage whose temperature influence the thickness of the gap are heated to a predetermined temperature.

In the following, embodiments of the invention are explained in more detail based on the drawing.

BRIEF DESCRIPTION OF THE DRAWING FIGURES

Figure 2:
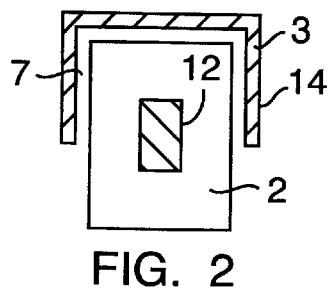
Figure 3:
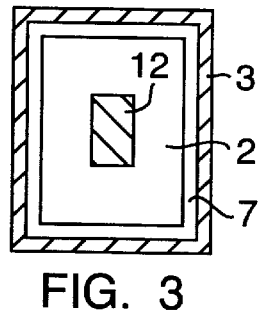
Figure 4:
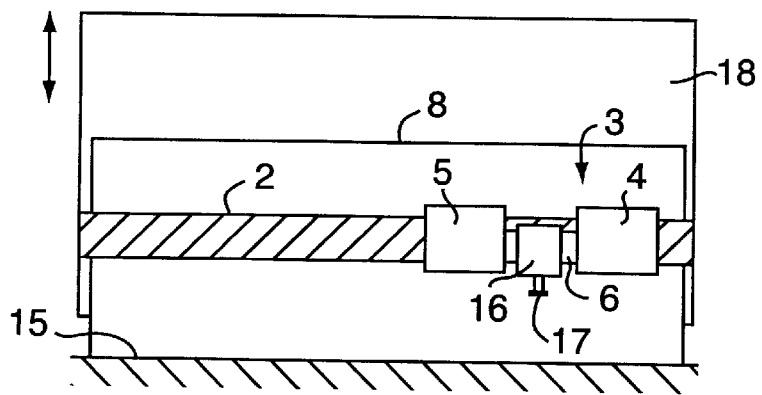

It is shown in:

FIG. 1 a linear guide with a support element and a carriage, and a drive mechanism for the carriage, FIGS. 2, 3 a cross-section of the support element and the carriage and FIG. 4 a pick and place system of a Die Bonder.

DETAILED DESCRIPTION OF THE INVENTION

FIG. 1 shows a perspective view of a linear guide 1 which comprises a support element 2 and a carriage 3 sliding on the support element 2. The support element 2 is a cylindrical bar. The carriage 3 has two hollow cylinders 4 and 5 sliding on air bearings on the support element 2 and a body 6 arranged between them. The support element 2 and the two hollow cylinders 4 and 5 of the carriage 3 are separated by a gap 7 to which compressed air can be applied. The supply of compressed air takes place via nozzles arranged on the inner walls of the two hollow cylinders 4 and 5. The air bearing of the carriage 3 allows the wear-free movement of the carriage 3 along the support element 2. The two hollow cylinders 4 and 5 are preferably formed from one single part whereby the body 6 is arranged roughly in the middle of this part.

A linear motor formed from a u-shaped stator 8 and an armature 9 is foreseen as the driving mechanism for the carriage 3. In this perspective, the armature 9 is not visible and is therefore indicated by a broken line. For further details concerning the driving mechanism, reference is made to the European patent application No. 98810988.0 which is explicitly incorporated herein by reference. The armature 9 is rigidly connected to the body 6 of the carriage 3. As a result of its weight, the armature 9 exerts a torque on the carriage 3. To take up this torque, a rail 10 is foreseen on which a wheel 11 mounted on the body 6 of the carriage 3 runs. In order to guarantee the permanent contact of the wheel 11 on the rail 10, preferably a second, spring-mounted (not presented) wheel is foreseen which runs on the rear of the rail 10. Alternatively, a vacuum-loaded air bearing can be foreseen in that, instead of the wheel 11 or both wheels, a part exists secured to the body 6 with a vacuum-loaded sliding surface in relation to the rail 10 to which air is applied.

The linear guide described and the linear motor can be used, for example, as the Pick and Place system of a Die Bonder. During operation, the current flowing through the armature 9 produces heat which also heats the carriage 3 and, as a result of this, the corresponding changes in the length of the carriage 3 and the support element 2 lead to a change in the thickness of the gap 7. In extreme cases, this can lead to either the air gap becoming smaller and smaller and the carriage 3 under load touching the support element 2, or the air gap becoming larger and larger causing the characteristics such as the rigidity or the carrying force of the air bearing to deteriorate. In order to eliminate changes in the thickness of the gap 7 which exceed a predetermined degree, it is suggested in accordance with the invention to maintain the temperature of those parts of the linear guide whose temperature has an influence on the thickness of the gap 7 at a predetermined temperature or within a predetermined temperature range. To do this heating elements are foreseen. The temperature is preferably controlled. The value at which the temperature is controlled is determined corresponding to the amount of heat supplied by the armature 9 in extreme cases so that the carriage 3 under no circumstances touches the support element 2 and that the rigidity of the air bearing remains within predetermined limit values. Examples are now explained in more detail:

EXAMPLE 1

Electrical heating elements are arranged inside the support element 2. The dimensions of the support element 2 and the hollow cylinders 4 and 5 are selected corresponding to the thermal expansion coefficients of the materials used for them so that the thickness of the gap 7 amounts, for example, to 8 $\mu$m when the temperature of the support element 2 is controlled to a value of 60° C. A temperature sensor is arranged in the support element 2 for measuring the temperature.

EXAMPLE 2

Here, the two hollow cylinders 4 and 5 of the carriage 3 have electrical heating elements 12 in order to maintain their temperature within a predetermined tolerance range. The temperature is preferably controlled at a predetermined value. For this purpose, a temperature sensor is arranged in the hollow cylinder 4 or 5. Again, the dimensions of the support element 2 and the hollow cylinders 4 and 5 are selected corresponding to the thermal expansion coefficients of the materials used for them so that the thickness of the gap 7 amounts, for example, to 8 $\mu$m when the temperature of the hollow cylinders 4 and 5 is controlled to a value of 60° C.

EXAMPLE 3

A combination of the two examples is also possible, i.e., the use of heating elements in the support element 2 as well as in the hollow cylinders 4 and 5. Furthermore, it is possible to control the support element 2 at a different temperature to that for the two hollow cylinders 4 and 5.

EXAMPLE 4

An important sub-task which the invention should solve comprises the limiting of the influence of the dissipated heat fed to the air bearing from the armature 9 during operation or maintaining the thickness of the gap 7 between the support element 2 and the hollow cylinder 4 or 5 to within predetermined limits. In order to maintain the temperatures at which the support element 2 or the hollow cylinders 4 and 5 are to be controlled as low as possible, the body 6 and/or the hollow cylinders 4 and 5 can have cooling fins in order to release as large a part as possible of the dissipated heat to the environment.

FIG. 2 shows a cross-section of a linear guide 1 with which the support element 2 has a rectangular cross-section. The hollow cylinders 4, 5 of the embodiment explained based on FIG. 1 are replaced by u-shaped carriage parts 14. A heating element 12 mounted in the support element 2 is also visible. FIG. 3 shows a linear guide 1 with which the carriage 3 completely surrounds the support element 2.

The linear guide 1 in accordance with the invention (FIG. 1) is especially suited for use in a Pick and Place system of a Die Bonder 15, as shown in FIG. 4. In this case, the carriage 3 carries a bondhead 16 with a chip gripper for the picking, transporting and placement of semiconductor chips 17. The support element 2 is preferably formed as part of a frame 18 which can be raised and lowered in vertical direction (indicated by arrows) whereby additionally, by means of a micromanipulator, the frame 18 can be moved typically by up to around 250 $\mu$m in horizontal direction laterally with respect to the longitudinal direction of the support element 2 while the stator 8 is arranged stationary on a platform of the Die Bonder 15.

What is claimed is:

1. Linear guide comprising:
   a support element; and
   a carriage sliding on the support element, the carriage and the support element being separated by a gap to which compressed air can be applied;
   the support element including at least one heating element in conductive heat transfer relationship with the support element for heating the support element in order to maintain the temperature of those parts of the support element whose temperature influence the thickness of the gap within a predetermined tolerance range.

2. Linear guide according to claim 1, wherein the carriage includes at least one further heating element for heating those parts of the carriage, whose temperature influence the thickness of the gap, within a predetermined tolerance range.

3. Linear guide according to claim 2, wherein the temperature of the support element is controlled at a predetermined value.

4. Linear guide according to claim 1, wherein the temperature of those parts of the carriage whose temperature influence the thickness of the gap is controlled at a predetermined value.

5. Linear guide according to claim 2, wherein the temperature of the support element is controlled at a predetermined value and in that the temperature of those parts of the carriage whose temperature influence the thickness of the gap is controlled at a predetermined value.

6. Linear guide according to claim 1, wherein a linear motor comprising a stator and an armature to which electrical current can be applied is foreseen as the drive mechanism for the carriage and that the armature is rigidly connected to the carriage.

7. Linear guide according to claim 2, wherein a linear motor comprising a stator and an armature to which electrical current can be applied is foreseen as the drive mechanism for the carriage and that the armature is rigidly connected to the carriage.

8. Linear guide according to claim 3, wherein a linear motor comprising a stator and an armature to which electrical current can be applied is foreseen as the drive mechanism for the carriage and that the armature is rigidly connected to the carriage.

9. Linear guide according to claim 4, wherein a linear motor comprising a stator and an armature to which electrical current can be applied is foreseen as the drive mechanism for the carriage and that the armature is rigidly connected to the carriage.

10. Linear guide according to claim 5, wherein a linear motor comprising a stator and an armature to which electrical current can be applied is foreseen as the drive mechanism for the carriage and that the armature is rigidly connected to the carriage.

11. Die Bonder with a Pick and Place system which comprises a linear guide according to claim 5.

12. Die Bonder with a Pick and Place system which comprises a linear guide according to claim 6.

13. Die Bonder with a Pick and Place system which comprises a linear guide according to claim 7.

14. Die Bonder with a Pick and Place system which comprises a linear guide according to claim 8.

15. Die Bonder with a Pick and Place system which comprises a linear guide according to claim 9.

16. Die Bonder with a Pick and Place system which comprises a linear guide according to claim 10.

* * * * *